United States Patent [19]

Ogasawara

[11] Patent Number: 4,915,485
[45] Date of Patent: Apr. 10, 1990

[54] DOOR MIRROR ASSEMBLY

[75] Inventor: Morihiko Ogasawara, Aichi, Japan

[73] Assignee: Kabushiki Kaisha Tokai Denki Seisahusho, Aichi, Japan

[21] Appl. No.: 373,441

[22] Filed: Jun. 30, 1989

[30] Foreign Application Priority Data

Jul. 4, 1988 [JP] Japan .............................. 63-88923[U]

[51] Int. Cl.⁴ .................................................. G02B 5/08
[52] U.S. Cl. ..................................... 350/604; 350/632; 248/479; 49/496
[58] Field of Search ........................ 350/604, 605, 632; 49/496, 490, 491; 248/599, 479, 480

[56] References Cited

U.S. PATENT DOCUMENTS

| | | | |
|---|---|---|---|
| 4,764,004 | 8/1988 | Yamada et al. | 350/632 |
| 4,769,950 | 9/1988 | Ogawa et al. | 49/490 |
| 4,826,305 | 5/1989 | Ogasawara | 350/631 |
| 4,843,759 | 7/1989 | Kisanuki et al. | 49/490 |

FOREIGN PATENT DOCUMENTS 60-124355  8/1985  Japan .

Primary Examiner—Bruce Y. Arnold
Assistant Examiner—Jay Ryan
Attorney, Agent, or Firm—Birch, Stewart, Kolasch & Birch

[57] ABSTRACT

A door mirror assembly having a sealing arrangement between opposed faces of mirror stay and mirror case to seal a clearance therebetween. The sealing arrangement includes annular outer and inner flexible lip members projecting, respectively, from a curved end face of case in parallel and neighboring with each other. The outer lip member is slightly higher than the inner lip member to contact the opposed end face in a normal condition, that is, when centers of the curved end faces are concentrically arranged. When the center of the curved end face is erroneously arranged to be eccentric to the center of the curved end face so as to be too close to the stay, the inner lip comes to be in contact with the end face of the stay.

5 Claims, 5 Drawing Sheets

DOOR MIRROR ASSEMBLY

BACKGROUND OF THE INVENTION

1. Field of the invention

The present invention generally relates to a door mirror assembly for use in motor vehicles and more particularly to a sealing arrangement which includes a sealing means for preventing the air from passing through a clearance made between a mirror stay and a mirror case during the driving of the vehicle to eliminate or reduce the possible noise due to the rapid passage of the air therebetween.

2. Description of the related art

As is well known, there has been provided the above-described type door mirror assembly which has a mirror stay secured on the outer surface of a door of a motor vehicle and a mirror case including therein a mirror and a mirror driving unit and pivotally mounted on the mirror stay. Japanese laid-open utility model publication No. 60-124355 shows the above-described type door mirror assembly which has a sealing arrangement between the mirror stay and mirror case. The sealing arrangement comprises an annular or endless sealing lip member projecting from a curved end face of the mirror case toward a curved end face of the mirror stay which faces the end face of the case. The lip member extends along the periphery of the end face of the mirror case so as to seal the clearance made between the opposed end faces of the mirror case and stay. Accordingly, when the motor vehicle runs, the air is prevented from passing through the clearance between the mirror case and stay, resulting in the reduction of the possible noise which may be generated by the rapid passage of the air through said clearance.

As is well known, the centering of the centers of the curved end faces of the mirror case and stay is difficult. Accordingly, it is not avoidable that the centers of both curved end faces of the case and stay are erroneously made eccentrically. According to the conventional art, in this case, the frictional force between the lip member and the opposed end face comes quite large and an undesirable gap therebetween advantageously appears.

Further, when the mirror case is rotated between a normal position, in which a driver can see the mirror, and a laid position in which the mirror case become substantially parallel with the door, the tip portion of the lip member frictionally slides on the end face of the mirror stay. In the conventional art, the sealing member does not easily deform due to the frictional force between the member and the end face of the mirror stay. Therefore, if the frictional force is relatively large, the smooth movement of the mirror case with respect to the mirror stay is not ensured, and also uncomfortable loud noise is generated. Thus, the height of the projected sealing means must be precisely adjusted so that the frictional force is relatively small. It is to be noted that it is quite difficult to completely eliminate the error of the height of the lip member at every portions thereof. Therefore, when there is an error, even though it is a slight error, a gap between the lip member and the end face of the mirror stay may be made, disadvantageously to permit the passage of the air therethrough.

SUMMARY OF THE INVENTION

Accordingly, an essential object of the present invention is to provide a door mirror assembly having a sealing arrangement, in which, even when the centering of the centers of the curved end faces of the mirror case and stay is made so as to slightly eccentric with each other, the complete sealing of the clearance therebetween is ensured.

Another important object of the present invention is to provide a door mirror assembly having a sealing arrangement, in which when the mirror case is rotated, the generation of the possible uncomfortable noise due to the friction between the lip member and the opposed end face confronting the lip member is avoided, and even if there are some errors as to the height of the projected lip members, the formation of the possible gap between the lip member and the opposed end face is prevented so that the noise due to the passage of the air can be effectively eliminated.

Another important object of the present invention is to provide a sealing arrangement which is simple in construction and stable in operation.

In accomplishing these and other object, according to the present invention, there is provided a door mirror assembly for use in motor vehicles having a mirror stay adapted to be secured to a door, and a mirror case mounted on the mirror stay pivotally between a forward normal position and rearward unused position, the mirror stay and case having, respectively, curved end faces facing each other with a slight clearance maintained therebetween, wherein the improvement comprises sealing means which is mounted on one of said end faces to seal said clearance so that passage of air through the clearance is prevented, said sealing means including at least two pairs of lip members, one pair of lip members being arranged at a forward side of the mirror assembly so as to extend substantially in the vertical direction in parallel and neighboring with each other, the other pair of lip members being arranged at a rear side of the mirror assembly so as to extend substantially in the vertical direction in parallel and neighboring with each other, one of outer and inner lip members of each pair being slightly higher than the other of the lip members to contact the opposed end face when centers of the curved end faces of the mirror stay and case are arranged to be concentric to each other.

With the construction as described above, supposing here that the outer lip member is higher than the inner lip member, when the centers of the curved end faces are concentrically arranged, only the outer lip members contact the opposed end face, namely the simultaneous contact of both outer and inner lip members with the opposed end face is prevented. Accordingly, the frictional force between the lip members and the opposed end face is not large so that the smooth rotation of the mirror case with respect to the mirror stay is ensured. Even if the center of the curved end face of the mirror case is erroneously arranged to be eccentric to the center of the curved end face of the mirror stay so as to be too close to the stay and accordingly the outer lip members leave the opposed end face, the inner lip comes to be in contact with the end face of the stay so that the sealing of the clearance between the end faces of the mirror case and stay is ensured.

It is preferable that the lip members are made of flexible material to easily deform when they are given a frictional force from the opposed end face in order to reduce the frictional force between the lip member and the opposed end face.

It is also preferable that the sealing means comprises a pair of lip members which includes an annular or endless outer lip member and an annular inner lip member. With this construction, the passage of the air is prevented from passing the clearance from and to any of directions.

It is also preferable that the mirror case comprises a covering plate which faces the end face of the mirror stay and defines the end face of the mirror case and the sealing means is integrated with said covering plate by way of insert plastic molding. With this construction, the lip members of the sealing means can be made precisely in its dimensions and the entire configuration of the combination of the sealing means and the covering plate can be made uniformly. Therefore, the lip members can be easily precisely positioned with respect to the opposed end face.

BRIEF DESCRIPTION OF THE DRAWINGS

These and other objects and features for the present invention will become apparent from the following description taken in conjunction with the preferred embodiment thereof with reference to the accompanying drawings, in which.

DETAILED DESCRIPTION OF THE INVENTION

Figure 1:
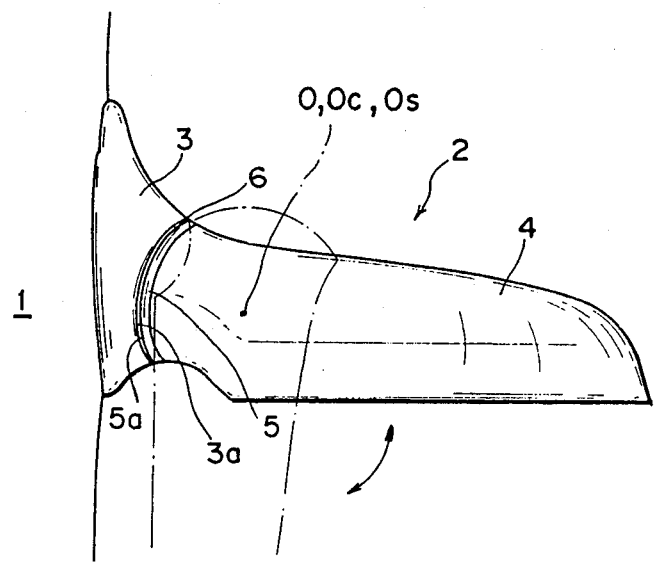
FIG. 1 is a top plan view showing a door mirror assembly secured on a door of a motor vehicle, which includes a sealing arrangement according to one embodiment of the present invention.

Before the description of the present invention proceeds, it is to be noted that like parts are designated by like reference numerals throughout the accompanying drawings.

Referring first to FIG. 1, a mirror assembly 2 including a sealing arrangement according to one preferred embodiment of the present invention is mounted on a door 1 of a motor vehicle. The door mirror assembly 2 comprises a stay 3 secured on an outer surface of the door 1, and a mirror case 4 which includes a mirror and a mirror driving unit is pivotally supported by the mirror stay 3 from below. The mirror stay 3 and case 4 have, respectively, curved or cylindrical faces 3a and 5a confronting each other, between which a small clearance 6 is formed. The mirror case 4 is rotatable between a normal position as shown by solid lines in FIG. 1, in which the driver can see the mirror, and a laid position as shown by dot and dash lines in which the mirror case 4 is laid to be parallel to the door 1. The mirror case 4 has, at its end close to the stay 3, a curved covering plate 5 as a part thereof which defines said end face 5a.

Figure 2:
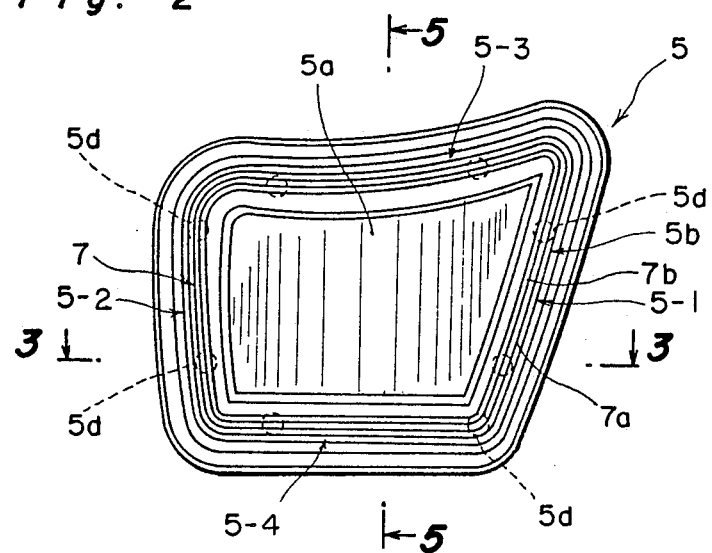
FIG. 2 is an enlarged front view showing a covering plate defining a part of the mirror case in FIG. 1.

The covering plate 5 is schematically rectangular as shown in FIG. 2, and convex so as to correspond to the concave end face of the stay 3 as shown in FIG. 1. As shown in FIGS. 2-6, a circumferential, annular or endless groove 5b is formed in the end face 5a of the covering plate 5. The groove 5b comprises two pairs of portions. One pair of portions 5-I, 5-II are located at the forward and rear sides of the plate 5, supposing that the forward direction of the vehicle is "forward", while the other pair of portions 5-III, 5-IV are located at the upper and bottom sides of the plate 5. The plate 5 has, at its inner face, a plurality of recesses 5d which communicate with the groove 5b through the corresponding holes 5c.

The plate 5 is provided with a circular sealing means 7 which is held in the groove 5b. The member 7 is made of a flexible material such as polyurethane rubber and comprises a circular, annular or endless main body 7c inserted in the groove 5, a plurality of legs each having a thin portion 7d passing through the corresponding hole 5c and a thick portion 7e inserted in the corresponding recess 5d, and a pair of annular lip members 7a and 7b which are made integrally with the other parts.

Figure 3:
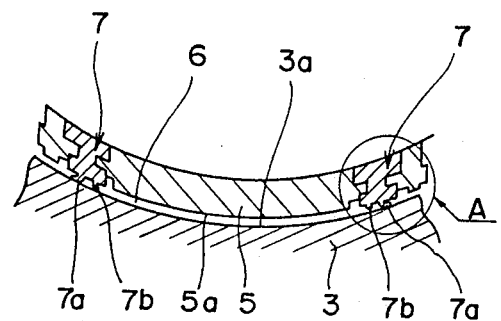
FIG. 3 is a section taken along a line III—III in FIG. 2.
Figure 4:
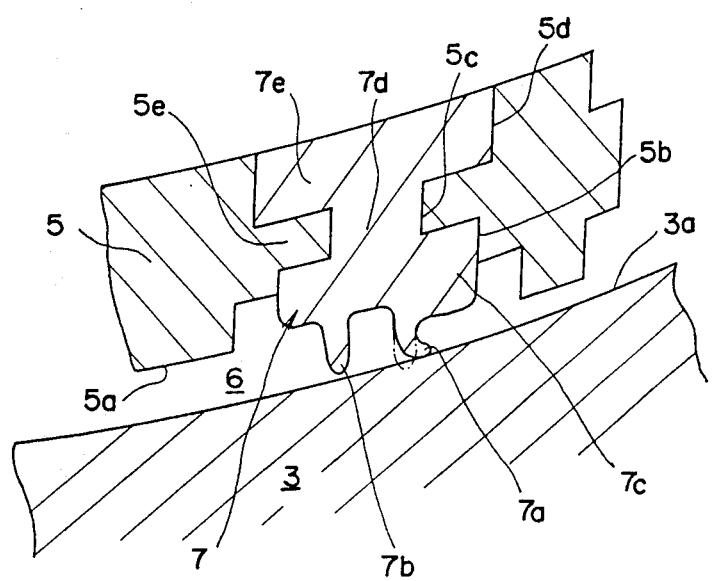
FIG. 4 is an enlarged section of a part indicated by a circle A in FIG. 3.
Figure 5:
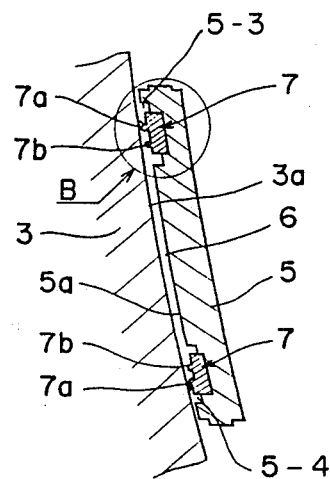
FIG. 5 is a section taken along a line V—V in FIG. 2.
Figure 6:
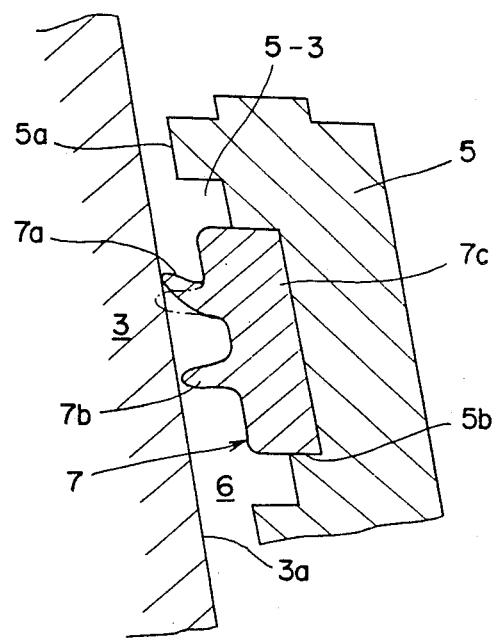
FIG. 6 is an enlarged section of a part indicated by a circle B in FIG. 5.

The pair of lip members 7a and 7b are thin enough to easily deform or bend and neighboring in parallel with each other. The height of the outer lip member is slightly larger than that of the inner lip member 7b, by, for example: 0.15 mm. Normally, that is, when the centers of the end faces 3a and 5a are made substantially concentric in the assembling of the mirror assembly, the sealing arrangement is designed so that tip portion of only the outer lip member 7a contact the corresponding end face 3a of the stay 3 in such a manner in which the tip portion thereof easily deforms by the frictional force from the end face 3a, as indicated in FIGS. 3, 4; 5, 6. It is to be noted that FIGS. 3, 4 show cross section of the portions 5-I, 5-II, while FIGS. 5, 6 show cross section of the other portions 5-III, 5-IV.

The sealing means 7 is integrated with the plate 5 by way of insert plastic molding. That is, first the plate 5 is molded by using thermoplastic resin such as acril/ethylene/propylene/styrene copolymer. Thereafter, the molded plate 5 is inserted in a mold and subsequently the sealing means 7 is molded together with the inserted plate 5 by using urethane rubber.

In manufacturing and assembling the door mirror assembly, the end face 5a of the case 4, accordingly the imaginary plane defined by the tip portion of the sealing means 7, and the end face 3a of the stay 3 should be, respectively, parts of a precisely cylindrical or spheric planes and a center axis $O_s$, $O_c$ of such a cylindrical or spheric planes should correspond with the pivotal axis 0 of the mirror case 4 so that the tip portion of the lip members 7a may precisely contact the face 3a of the stay 3 at their every positions. However, some errors normally occur in manufacturing and assembling them. According to the above-described embodiment of the present invention, even in such a case, the complete sealing of the clearance 6 is ensured by the sealing means 7.

Figure 7A:
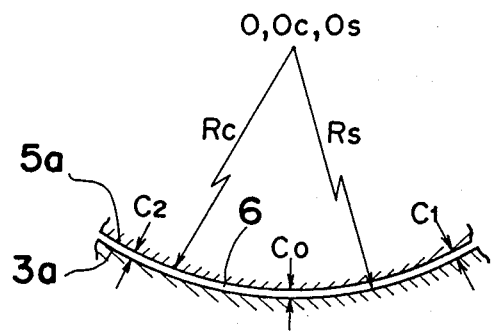
FIGS. 7A, 7B and 7C are, respectively, views showing the modifications of assembling the mirror assembly or configuration of the end faces of the mirror case and stay.
Figure 7B:
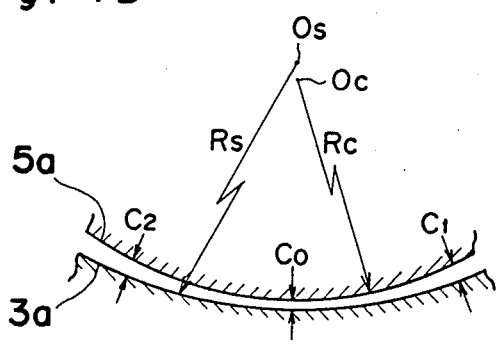
Figure 7C:
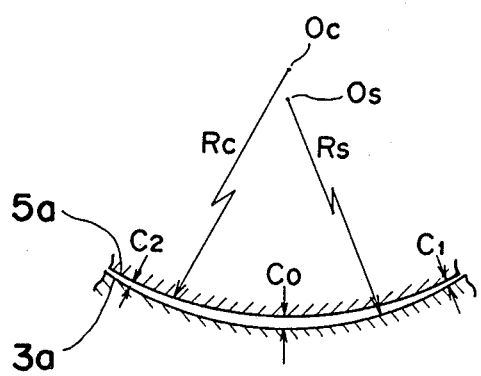

FIGS. 7A, 7B, 7C show modifications of manufacturing and assembling these parts. In FIG. 7A, both centers $O_c$, $O_s$ of the end faces 5a, 3a are concentric with the pivotal axis O. Thus, the gap $C_1$ at the forward side, the gap $C_2$ at the rear side and the gap $C_o$ at the intermediate portion are the same in dimension. In this case, as shown in FIGS. 4, 6, only outer lip member 7a contacts the end face 3a of the stay 3, while the inner lip member 7b is not in contact with it, provided the radii $R_c$, $R_s$ of the end faces 5a, 3a are made in the desired dimensions.

Figure 4A:
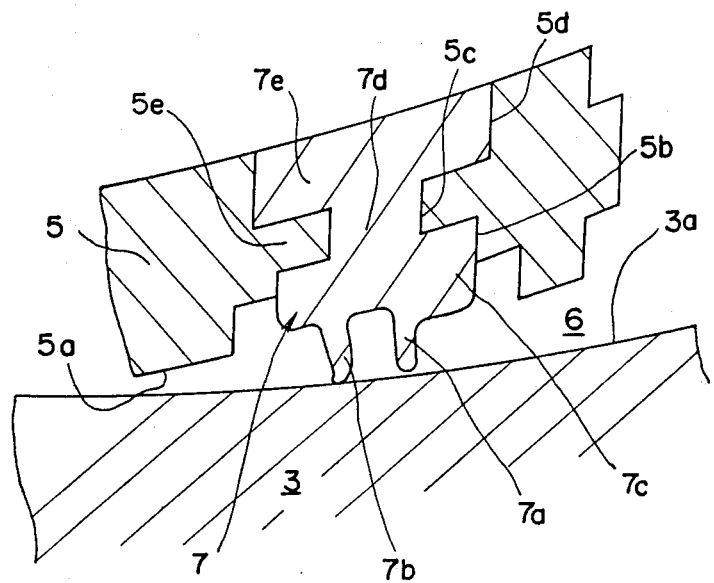
FIGS. 4A and 4B are, respectively, views similar to FIG. 4, showing the modifications of assembling the mirror assembly.

In FIG. 7B, the center $O_c$ of the end face $5a$ is closer to the end face $3a$ with respect to the center $O_s$ of the end face $3a$. Thus, the gaps $C_1$, $C_2$ are bigger than the gap C. In this case, as shown in FIG. 4A, the inner lip member $7b$ comes to be in contact with the end face $3a$, while the outer lip member $7a$ leaves the end face $3a$.

Figure 4B:
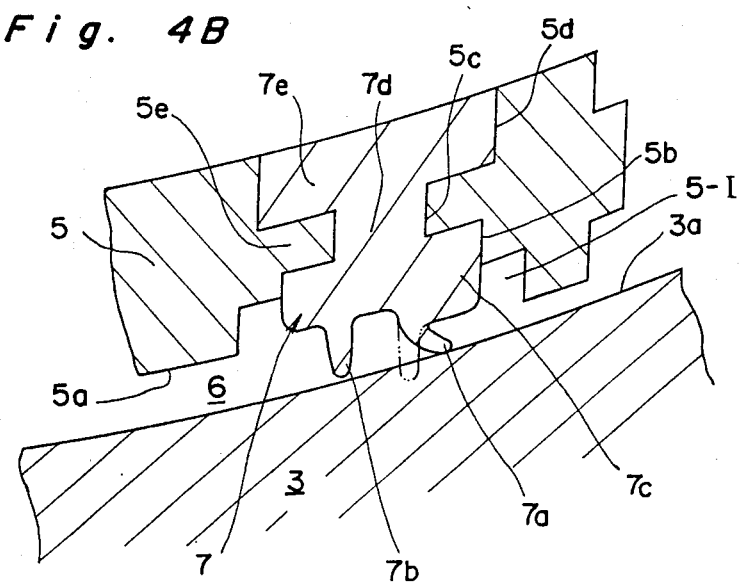

In FIG. 7C, the radius $R_c$ of the end face $5a$ is longer than the radius $R_s$ of the end face $3a$. Thus, the gaps $C_1$, $C_2$ are smaller than the gap $C_o$. In this case, as shown in FIG. 4B, the outer lip member $7a$ is pressed more strongly than the case as shown in FIG. 4.

Further, since the lip members $7a$, $7b$ are very flexible to easily deform or bend, even if the dimension of the clearance 6 varies irregularly due to, for example, the sinkmark appearing in the step of molding of the sealing means 7, covering plate 5 and the stay 3, the lip members $7a$ can flexibly contact the outer face $3a$ of the stay 3.

Accordingly, the passage of the air is efficiently avoided during the driving of the motor vehicle. Further, the smooth rotation of the case 4 with respect to the stay 3 is ensured and also the uncomfortable noise is not produced or is reduced.

Further, since the sealing means 3 and the plate 5 are made integrally with each other by way of insert plastic molding, the lip members $7a$ and $7b$ can be made precisely in its dimensions and the entire configuration of the sealing means and plate 5 can be made uniformly. Therefore, the lip members $7a$ and $7b$ can be easily precisely positioned with respect to the end face $3a$ of the stay 3.

Further, since the means 7 has a plurality of legs $7d$ and $7e$ engaging the holes $5c$ and recesses $5d$, the sealing means 7 is surely fixed to the plate 5 and the position of the tip portion of the lip members $7a$ and $7b$ with respect to the plate 5 is very stable.

Although the present invention has been fully described by way of example with reference to the accompanying drawings, it is to be noted here that various changes and modifications will be apparent to those skilled in the art.

According to the above-described embodiment, the sealing of the clearance 6 is advantageously effected by the outer lip member $7a$ when the manufacturing and assembling of the mirror assembly are in good conditions. However, according to a modification of the present invention, the inner lip member $7b$ may be designed to be higher than the outer lip member $7a$. In this case, if it is under the condition as shown in FIG. 7A, the inner lip member contacts the end face $3a$, while the outer lip member is not in contact with the end face $3a$. If it is under the condition as shown in FIG. 7B, the inner lip member contacts more strongly the end face $3a$. If it is under the condition as shown in FIG. 7C, the inner lip member leaves the end face $3a$, while the outer lip member comes to be in contact with the end face $3a$.

Further, the sealing means 7 may be secured on the end face $3a$ of the stay 3 instead of the plate 5. In this modification, the sealing means 7 slides on the end face $5a$ of the plate 5. Further, the sealing means 7 may be secured on only the forward and rear portions of the outer face $5a$ of the plate, that is, the upper and lower portions 5-III, 5-IV of the sealing means may be omitted.

Therefore, unless otherwise such changes and modifications depart from the scope of the present invention as defined by the appended claims, they should be construed as included therein.

What is claimed is:

1. In a door mirror assembly for use in motor vehicles having a mirror stay adapted to be secured to a door, and a mirror case pivotally mounted to the mirror stay between a forward normal position and a rearward unused position, the mirror stay and case having, respectively, curved end faces facing each other with a slight clearance maintained therebetween, wherein the improvement comprises:
    sealing means which is mounted on one of the end faces to seal the clearance so that passage of air through the clearance is prevented,
    said sealing means including at least two pairs of lip members, one of such pair of lip members being arranged at a forward side of the mirror assembly so as to extend substantially in the vertical direction in parallel and adjacent to each other, the other pair of lip members being arranged at a rear side of the mirror assembly so as to extend substantially in the vertical direction in parallel and adjacent to each other, one of the outer and inner lip members of each pair being slightly longer than the other of said pairs of lip members so as to contact the opposed end face when centers of the curved end faces of the mirror stay and case are arranged to be concentric to each other.

2. The door mirror assembly as claimed in claim 1, wherein said lip members are made of flexible material to easily deform when they receive a frictional force from the opposed end face.

3. The door mirror assembly as claimed in claim 1, wherein said mirror case comprises a covering plate which faces the end face of the mirror stay and defines the end face of the mirror case.

4. The door mirror assembly as claimed in claim 3, wherein said sealing means is integrated with said covering plate by way of an insert plastic molding.

5. In a door mirror assembly for use in motor vehicles having a mirror stay adapted to be secured to a door, and a mirror case pivotally mounted to the mirror stay between a forward normal position and a rearward unused position, the mirror stay and case having, respectively, curved end faces facing each other with a slight clearance maintained therebetween, wherein the improvement comprises:
    sealing means which is mounted on one of the end faces to seal the clearance so that passage of air through the clearance is prevented,
    said sealing means comprising a pair of lip members which includes an annular outer lip member and an annular inner lip member, the outer and inner lip members extending in parallel and adjacent to each other, one of outer and inner lip members being slightly longer than the other of the lip members to contact the opposed end face when centers of the curved end faces of the mirror stay and case are arranged to be concentric to each other.

* * * * *